May 31, 1955

E. BUSSEI 2,709,377

HYDROMECHANICAL SERVOMOTOR

Filed Dec. 29, 1953

INVENTOR

Ettore Bussei

BY

ATTORNEY

May 31, 1955

E. BUSSEI 2,709,377

HYDROMECHANICAL SERVOMOTOR

Filed Dec. 29, 1953

INVENTOR
Ettore Bussei
BY
ATTORNEY

May 31, 1955

E. BUSSEI 2,709,377

HYDROMECHANICAL SERVOMOTOR

Filed Dec. 29, 1953

INVENTOR
Ettore Bussei
BY
ATTORNEY

United States Patent Office 2,709,377
Patented May 31, 1955

2,709,377

HYDROMECHANICAL SERVOMOTOR

Ettore Bussei, Genoa, Italy

Application December 29, 1953, Serial No. 401,023

8 Claims. (Cl. 74—691)

This invention relates to servomotors and its object is to provide a power-driven mechanism which supplements a primary control.

The servomotor according to the invention is characterised by the feature that a controlled shaft is driven by a uniformly revolving power-driven shaft through a continuous variable-driving and reversing friction gear which is automatically adjusted to the angular speed and direction of the primary control shaft by a hydraulical servomotor, which motor is controlled in relation to the differences in prescribed speeds between controlled shaft and primary control shaft, each of which is connected, either directly or indirectly, to a driver of a differential gearing.

A preferred embodiment of the invention is described hereinafter with reference to the accompanying drawings, in which.

Figure 1:
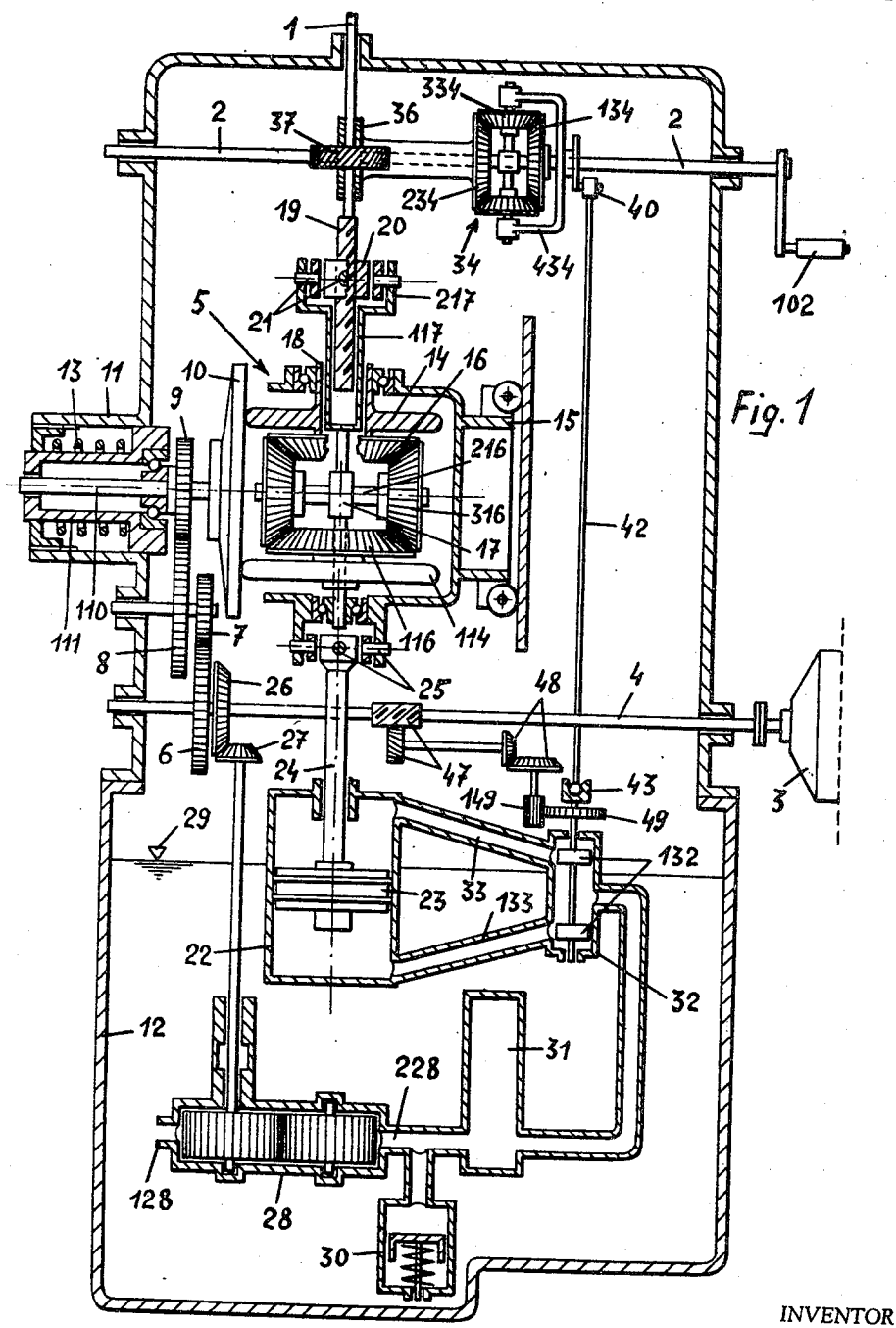
Fig. 1 shows diagrammatically a hydromechanical servomotor constructed according to the invention.

In the drawing, 1 is the servomotor-controlled shaft which, in the example as shown, reproduces exactly but with much greater power the angular movements, viz. the speed and direction of a primary control shaft 2, which has been shown as controlled by means of a hand crank 102. The controlled shaft 1 is driven by a uniformly revolving power shaft 4 rotated by a motor 3 and is operatively connected to said controlled shaft 1 by means of a variable driving and reversing friction gear 5.

Figure 2:
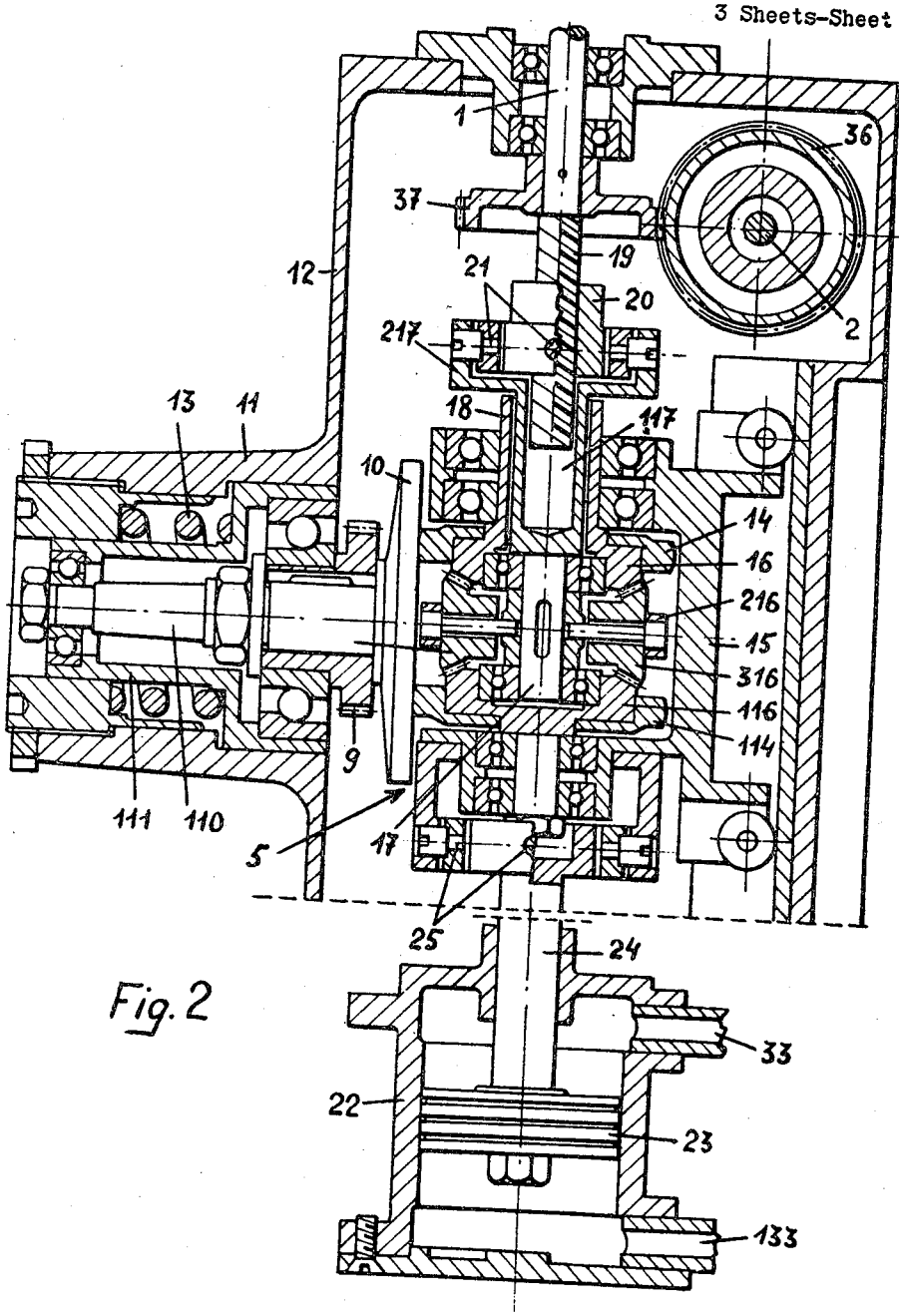
Fig. 2 shows in a sectional view the variable driving and reversing gear and the parts, connected and cooperating therewith

Said variable driving and reverse friction gearing 5 which per se is substantially known, is better shown in Fig. 2. It comprises a friction plate 10 mounted on a stub shaft 110 which is operatively connected to said power shaft 4 through gear train 6—7—8—9. Said stub shaft 110 extends rearwardly in a supporting bearing 111 which is shiftably mounted within a supporting hub 11 fastened to or integral with the servomotor housing 12; said bearing 111 is being pushed towards the interior of said housing 12 by a spring 13. Opposite the friction surface of plate 10 a carriage 15 is shiftably mounted for displacement parallel to said friction surface of plate or disc 10. Said carriage 15 supports rotatably two co-axial independent friction pulleys 14, 114 the axes of which are located in a plane also containing the axis of said stub shaft. Each of the friction pulleys 14, 114 is fastened to one of the drivers 16, 116 of an equational gearing whose bevel pinions 316 are supported by a rigid frame comprising a cross shaft 216 connected to a central shaft 17. This central shaft 17 is idly mounted between the drivers 16 and 116 and passes freely with its extension 117 through a hub 18 of the pulley 14 to be connected to the controlled shaft 1. In the embodiment shown in Figs. 1 and 2 the connection between the control shaft 17 and the controlled shaft 1 is effected by means of a screw coupling 19—20. This screw coupling comprises a steep pitched thread 19 arranged upon the end of the controlled shaft 1 which projects into the hollow extension 117 of the central shaft 17. The enlarged end 217 of said extension 117 supports a universal joint 21 including a screw nut 20 with which the said threaded end 19 of shaft 1 co-operates.

By the described device the controlled shaft 1 is driven through the equational gearing 16, 116, 216, 316 with a speed corresponding to the difference in speed of the two friction pulleys 14 and 114 and the screw-coupling 19, 20 converts the shiftings of said pulleys into corresponding angular shiftings of shaft 1. Thus if pulleys 14, 114 remain in a fixed diametral position on plate 10, the screw nut 20 remains locked on spindle 19 and controlled shaft 1 is driven at the same speed as shaft 17 of the equational gearing. If the carriage 15 is shifted with respect to plate 10, the screw nut 20 is also shifted and thus promotes an angular shifting of screw spindle 19 integral with shaft 1, thus modifying its speed. This device reduces to a minimum the errors of reproduction of the servomotor.

The variable driving and reverse gear 5 is automatically controlled by a hydraulic power piston device which is sensible to the differences in speed between primary control shaft 2 and controlled shaft 1 and thus causes shaft 1 to be revolved at the same speed and in the same direction as shaft 2, or anyway at correlated speeds and directions.

The hydraulic power piston device as shown in Fig. 1 comprises a cylinder 22 in which a double-acting piston 23 is reciprocably mounted. The piston rod 24 is connected through a universal joint or the like 25 to the carriage 15 of gearing 5. The cylinder is fed with liquid, usually oil, contained in the container 12, up to level 29. The oil is pumped through suction port 128 of gear pump 28 driven by power shaft 4 through bevel gears 26—27 and is delivered to said cylinder through duct 228 leading into a distributing piston valve liner 32 in which a double piston valve 132, according to its position, either intercepts the communications with the cylinder 22, or uncovers the ports to either of the conduits 33, 133 leading each to an end of the cylinder 22. Duct 228 is provided with a pressure regulator 30 and an air chamber 31. It is to be noted that in the drawing, for clearness of showing, suction and outlet ducts 128, 228 have been rotated by 90° and placed in the plane of the drawing, but it is to be understood that actually they are situated at right angles to the plane of the drawing in a plane passing through the meshing line of the pump gears.

Figure 3:
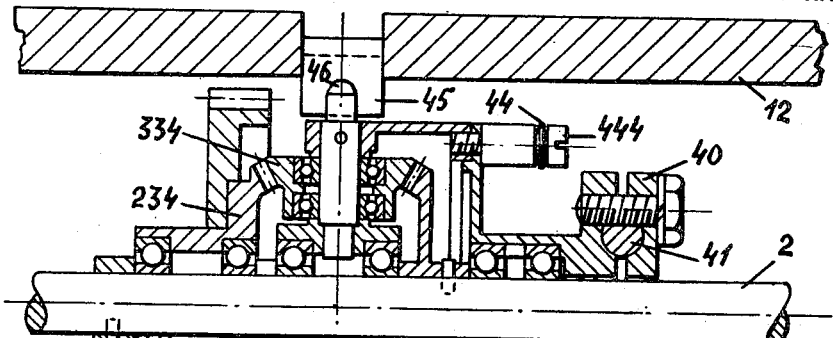
Figures 3 and 4 show in a sectional and in an elevational view the differential gearings connected both to the control shaft and the controlled shaft.
Figure 4:
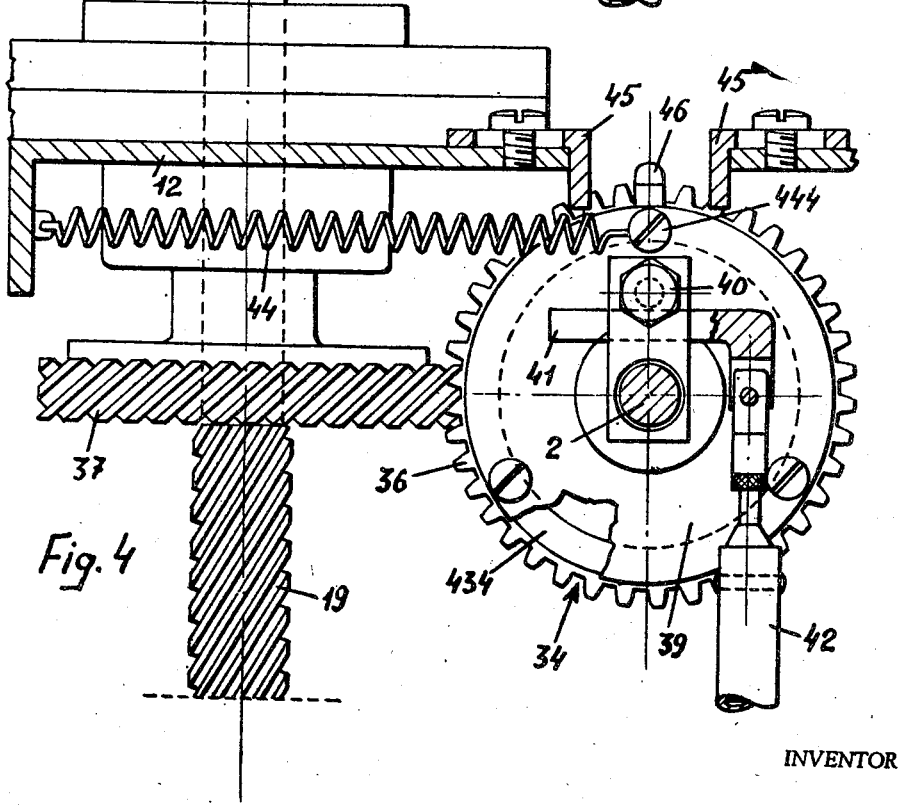

The piston pair 132 of distributing valve 32 is controlled by a differential gear 34 fitted on primary control shaft 2 on which one of the drivers 134 is fastened, while the other driver 234 is idle on said shaft 2 and is coupled to the controlled gear 1 through a helical gear pair 36, 37. The frame 434 on which the differential gear pinions 334 are mounted is idly mounted on shaft 2 and according to the embodiment shown in Fig. 1 is provided with a crank-like member 40 to which a connecting rod 42 is attached which by its other end is attached to a ball joint 43 fastened to the rod of the distributing piston pair 132. In the embodiment shown in Figs. 3 and 4 the differential gear frame 434 is connected to a disk 39 freely rotatably mounted on shaft 2 and carrying on a side projection a screw-locking member 40 in which a lever arm 41 is fastened to which the said piston valve-controlling rod 42 is secured. In order to facilitate the shifting of the piston valve 132 the same is rotated continuously by being operatively connected to power shaft 4 by means of a transmission permitting the shifting of the piston. In the shown embodiment a cylindrical toothed wheel 49 is fastened to the projecting part of the rod of the piston valve and meshes with a long pinion 149 along which wheel 49 may slide while in mesh. Pinion 149 is fastened to the end of a shaft carrying a first bevel gear forming with a second bevel gear the gear pair 43. The said second bevel gear is fastened to one end of another shaft carrying on its other end a gear meshing with another gear on shaft 4 and forming the gear pair 47.

In the embodiment shown in the drawing, the gear pump 28 and a number of other parts of the servomotor are dipped in oil which in practice serves not only as fluid for operating the power piston, but also as lubricant for the whole device, the lubrication taking place by capillarity, by splash or by the aid of other known means, not shown.

The operation of the device is actuating the piston valve 132 as follows: If a difference exists between the speeds of shafts 2 and 1, the differential gear frame 434 is rotated and the piston valve 132 is shifted in either direction so as to uncover either of the inlet ports to conduits 33 or 133 and to let oil under pressure into either end of cylinder 22, thus shifting piston 23 towards the opposite cylinder end, and shifting carriage 15 and friction pulleys 14, 114 of the variable driving gear carried thereby, until the angular speed and direction of shaft 1 corresponds to those prescribed for the control shaft 2. If on the contrary no difference exists between the angular speeds of shafts 2 and 1, the differential gear frame 434 remains stationary with the crank pin 40 or equivalent means in its middle position, in which the valve pistons 32 and 132 cover both ports to the cylinder 22 and thus the friction pulleys 14, 114 of the variable driving gear remain stationary.

In order to avoid that, in case of swift changes of speed of the control shaft 2, the device is subject to pendular movements, frame 434 carrying the pinions 334 of differential gear 34 is provided with means, such as attachment screw 444 for attaching thereto a spring 44 anchored to a part integral of housing 12. Furthermore, the movements of the pinions 334 in both directions are limited by opposite adjustable abutments 45 co-acting with a finger 46 fastened to frame 434.

Of course, the invention can undergo numerous changes without departing from the principles of my invention and without avoiding the scope of the appended claims. Thus, although in the specification it has been assumed that the primary control shaft and the controlled shaft revolve at the same angular speed, it is to be understood that their prescribed angular speeds may be different, provided the ratio between the speeds of control and controlled shaft be always the same. Therefore the term "prescribed angular speed" when applied to said controlled shaft shall be interpreted as a speed which is in a predetermined ratio (usually 1 : 1) to the speed of the primary control shaft.

What I claim as my invention is:

1. A hydromechanical servomotor comprising a rigid casing, a primary control shaft, a controlled shaft, a differential gearing having two drivers, means for operatively connecting one of the drivers to the said control shaft and means for operatively connecting the other driver to the said controlled shaft, and pinions carried by a rotatably mounted frame and meshing with both said drivers, a control member excentrically mounted on said pinion-carrying frame; a continuously revolving power shaft, a variable driving and reverse friction gear of the kind having a driving shaft and a driven shaft, said friction gear operatively connecting said driving shaft and said driven shaft so as to vary, according to their position, the driving ratio between driving shaft and driven shaft continuously from a positive maximum to a negative maximum, by passing through a neutral or non-driving position, means for operatively connecting said power shaft to said driving shaft of said friction gear; and means for operatively connecting said driven shaft of the variable gear to said controlled shaft of the servomotor, an oil container, a hydraulical power piston device having movable control member, and two inlets for oil under pressure, means connecting said movable members to said shiftable means of said variable gear, a distributing valve having an inlet and two outlets, each of said outlets communicating with one of said inlets of said power piston device and a shiftable member capable, according to its position, to intercept the communication of said valve inlet with either or both said valve outlets, a pump for pumping liquid, usually oil under pressure, having an inlet communicating with said oil container and an outlet communicating with the inlet of said distributing valve; means for operating said pump and means for operatively connecting said excentrical control member of the pinion-carrying frame of said differential gearing to said distributing valve of said power piston device.

2. A hydromechanical servomotor according to claim 1 in which said variable driving and reverse friction gear comprises a friction plate integral of the variable gear driving shaft and having a plane friction surface, a carriage mounted shiftable parallelly to said friction surface, a pair of pulleys having friction rims and mounted co-axially on said carriage with their axes parallel to a diameter of said friction plate, an axially shiftable supporting means for the said driving shaft mounted in said casing of the servomotor, spring means between said casing and said shaft-supporting means for yieldingly pressing said friction plate against said friction pulleys, an equational gearing, between said friction pulleys, comprising a pair of drivers, each driver being fastened to one of said friction pulleys, a carriage for said gearing, pinions carried by a rigid frame and meshing with both said drivers, a shaft integral of said pinion frame arranged co-axially of said pulleys and drivers and operatively connected to said controlled shaft of the servomotor, and means for rigidly connecting said friction pulleys and equational gear-supporting carriage to a movable member controlled by said power piston device.

3. A hydromechanical servomotor according to claim 2, in which the means for operatively connecting said driven shaft of the said variable gear comprises a hollow hub fastened to said driven shaft, a steep-pitch screw nut attached to said hollow hub by means of a universal joint and a steep-pitch screw-threaded spindle forming the end of said controlled shaft of the hydromechanical servomotor and projecting through said nut into said hollow hub.

4. A hydromechanical servomotor according to claim 3, in which the said power piston device comprises a cylinder having two ports by its ends, a double-acting piston slidable in said cylinder, a rod connecting said piston to the said carriage of the said variable gear, a piston valve liner having a middle inlet port and two outlet ports by the liner ends, means connecting each of said outlet ports of the liner to a port of the said power cylinder, a double piston valve shiftable in said liner, with its pistons rigidly connected together and arranged so as to be able to intercept the communication with either or both said liner outlet ports according to their position in their liner, the said pressure pump having its outlet connected to said inlet of said piston valve liner.

5. A hydromechanical servomotor according to claim 4 in which the oil is contained in the servomotor housing and the pump of the power piston device and other fixed and moving parts of the servomotor are dipped in said oil which serves also as lubricant for the movable member contained in said servomotor housing.

6. A hydromechanical servomotor according to claim 4, in which the means for operatively connecting one of the drivers of the differential gearing to said controlled shaft comprise a pair of helical gears and the means for connecting the differential gear frame, attached to the gear pinions, to the said distributing valve comprise anchoring means on a peripheral part of said pinion-carrying frame and on a fixed part of the servomotor, a spring tensioned between said anchoring means, a finger projecting from said frame, adjustable abutments on a fixed part of the device co-acting with said finger to limit the angular shiftings of said pinions, a member fastened excentrically to said frame and a connecting rod hinged by one of its ends to said excentric and by its other end to a universal joint fastened to a projecting part of said slidable-piston distributing valve.

7. A hydromechanical servomotor according to claim 5 in which the said slidable piston valve is cylindrical and has a projecting rod and the said universal joint is a ball joint and means for operatively connecting said piston valve rod to said continuously revolving power shaft for continuously rotating said piston valve while permitting its axial shiftings.

8. A hydromechanical servomotor comprising a housing, a primary control shaft, a controlled shaft, a differential gearing having two drivers, means for fastening one of said drivers to the said control shaft, and for idly supporting on said control shaft the other of said drivers and the remaining parts of said differential gearing, including supporting means arranged transversely of said control shaft, pinions idly rotatable on said supporting means with their axes perpendicular to the axis of said control shaft and meshing with both said drivers, a control member eccentrically fastened to said pinion-supporting means, a continuously revolving power shaft, a gear fastened to said second-named driver and a gear fastened to said controlled shaft meshing with said last-named gear, a variable driving and reverse gear having a driving shaft and a driven shaft and capable of establishing all driving ratios between said driving and said driven shaft, from a positive maximum to a negative maximum, passing to a neutral or non-driving position, said variable gear comprising a friction plate fastened to one end of said driving shaft, a gear train operatively connecting said driving shaft to said power shaft, a carriage shiftable parallelly and in front of said friction plate a pair of co-axial parallel friction pulleys carried by said carriage, and frictionally engaging said plate along one of its diameters, an equational gear having two drivers each fastened to one of said pulleys, a shaft idly traversing said drivers, supporting arms carried by said last-named shaft, pinions rotatably supported by said arms and meshing with both said drivers, screw means for coupling said last-named shaft to said controlled shaft, oil in said servomotor housing, a power cylinder containing a double-acting piston, a rod connecting said piston to said carriage of said variable gear, an oil-distributing double piston valve having an inlet and two outlets, each leading into one end of said power cylinder said double piston valve being capable, according to its position, to intercept the communication of said valve inlet with either or both said valve outlets, a pressure pump dipping in said oil and having an open inlet and an outlet communicating with the inlet of said distributing piston valve; means for operatively connecting said pump to said continuously rotating power shaft and means for operatively connecting said eccentrical control member of the pinion-carrying frame of said differential gearing to said distributing valve of said power cylinder.

References Cited in the file of this patent

UNITED STATES PATENTS

| 1,691,389 | Garrard et al. | Nov. 13, 1928 |
| 2,476,269 | Blackman | July 19, 1949 |

FOREIGN PATENTS

| 539,278 | Great Britain | Sept. 3, 1941 |
| 898,852 | France | May 9, 1945 |